(12) United States Patent
Albertini et al.

(10) Patent No.: US 6,940,383 B2
(45) Date of Patent: Sep. 6, 2005

(54) METHOD FOR INCREASING THE OPERATING FREQUENCY OF A MAGNETIC CIRCUIT AND CORRESPONDING MAGNETIC CIRCUIT

(75) Inventors: Jean-Baptiste Albertini, Grenoble (FR); Jean-Claude Peuzin, Herbeys (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/508,692

(22) PCT Filed: Sep. 22, 1998

(86) PCT No.: PCT/FR98/02069

§ 371 (c)(1),
(2), (4) Date: Mar. 29, 2000

(87) PCT Pub. No.: WO99/17319

PCT Pub. Date: Apr. 8, 1999

(65) Prior Publication Data

US 2002/0057172 A1 May 16, 2002

(30) Foreign Application Priority Data

Sep. 29, 1997 (FR) .......................................... 97 12080

(51) Int. Cl.[7] .............................................. H01F 5/00
(52) U.S. Cl. ....................................... 336/200; 257/531
(58) Field of Search .......................... 336/200; 257/531, 257/277, 331; 438/678, 686; 335/302–306

(56) References Cited

U.S. PATENT DOCUMENTS

| | | | | |
|---|---|---|---|---|
| 3,881,244 A | * | 5/1975 | Kendall | 29/602 |
| 4,341,998 A | * | 7/1982 | Castera et al. | 324/244 |
| 5,070,317 A | * | 12/1991 | Bhagat | 336/200 |
| 5,165,162 A | * | 11/1992 | Charles | 29/605 |
| 5,242,861 A | * | 9/1993 | Inaba | 437/190 |
| 5,376,912 A | * | 12/1994 | Casagrande | 336/178 |
| 5,566,442 A | * | 10/1996 | Gaud et al. | 29/603.14 |
| 5,648,884 A | * | 7/1997 | Lazzari | 360/113 |
| 6,030,877 A | * | 2/2000 | Lee et al. | 438/381 |
| 2001/0050607 A1 | * | 12/2001 | Gardner | |

FOREIGN PATENT DOCUMENTS

| | | | |
|---|---|---|---|
| EP | 0 308 334 A | | 3/1989 |
| JP | 03238804 | * | 2/1990 |
| JP | 5-62123 | * | 3/1993 |
| JP | 09 074016 | | 9/1995 |
| JP | 8-162352 | * | 6/1996 |

* cited by examiner

*Primary Examiner*—Lincoln Donovan
(74) *Attorney, Agent, or Firm*—Oblon, Spivak, McClelland, Maier & Neustadt, P.C.

(57) ABSTRACT

A process for increasing the frequency of operation of a magnetic circuit. In the process, gaps are formed in at least one section of the magnetic circuit. The gaps lower the permeability of the magnetic circuit and increase in particular the frequency of magnetic resonance and make possible the use of higher frequencies. Applications of the process include the manufacture of inductors, transformers, components, magnetic heads, etc . . .

8 Claims, 4 Drawing Sheets

US 6,940,383 B2

METHOD FOR INCREASING THE OPERATING FREQUENCY OF A MAGNETIC CIRCUIT AND CORRESPONDING MAGNETIC CIRCUIT

BACKGROUND OF THE INVENTION

1. Field of the Invention

The purpose of this invention is to provide a process for increasing the frequency of operation of a magnetic circuit and a corresponding magnetic circuit.

It has applications in the manufacture of magnetic components, especially inductive components (typically inductors, either single or multiple, or being part of a network of elementary components integrated into the same chip), in the manufacture of transformers, magnetic-field sensors, or instruments for measuring a quantity related to a magnetic field, magnetic recording heads, etc . . .

2. Discussion of the Background

In inductive components (inductors, transformers, magnetic heads, etc . . . ), it is advantageous to channel the magnetic flux by means of a high-permeability magnetic circuit as this permits either a gain in performance for a given size or a reduction in size for a given performance.

In macroscopic radio-frequency components, magnetic circuits are generally made of solid ferrite while, in integrated components, stacks of thin layers of ferromagnetic alloy (typically Fe—Ni) and insulating material are more frequently used. The development of such integrated components is presently underway through active research in many laboratories.

The miniaturization of these components makes it possible to increase their working frequency by reducing, in particular, propagation and induced-current phenomena.

The performance of insulator/alloy composites in the form of thin layers is much better than that of ferrite components and makes it possible to consider operation at frequencies extending well beyond the radio-frequency range. Nonetheless, these materials have their own limitations, related either to fundamental phenomena or to the technology used. Two limiting phenomena related to technology are skin effect and dimensional resonance. Both have the effect of reducing the effective permeability of the composite and altering its frequency response.

The first one can be avoided (or limited) by, as is done conventionally, choosing a thickness for the magnetic layers in the stack much smaller than, or on the same order of size as, the skin depth. As an example, the skin thickness is 0.2 $\mu$m at 1 GHz for the Fe—Ni alloy.

The second one, related to dimensional resonance, is associated with the electromagnetic propagation inside the composite in directions parallel to the layers. It can be limited, in one case, by maintaining a sufficient thickness of insulating material between the magnetic layers (to the detriment of the packing factor) and, in the other case, by limiting the side dimensions of the magnetic circuits or the cores.

Consequently, for a frequency of 1 GHz, the width of the Fe—Ni magnetic circuit or magnetic core should be much less than 700 $\mu$m, a condition just about compatible with integration concerns.

Another limitation, unrelated to the technology involved and more fundamental in nature, corresponds to the phenomenon of gyromagnetic resonance. The frequency of this resonance constitutes, as is known, an upper limit in the usable frequency range, knowing that at frequencies below this resonance the relative permeability is practically constant and equal to its static value. It is well known that, in an alloy with a given composition, it is possible, by means of simple heat treatments, to vary the permeability and the resonant frequency. Consequently, the limitation due to gyromagnetic resonance is not expressed only in terms of frequency. It can be shown that the product $\mu_2 \cdot f_r^2$, where $\mu_2$ is the static value of the permeability and $f_r$ the gyromagnetic resonant frequency, is constant for an alloy with a given composition when, through treatment after deposit, $\mu_2$ and $f_r$ are modified at the same time. This product thus constitutes a merit factor for the material, which depends only on its composition. It can be shown that it depends practically only on the spontaneous magnetization of the alloy. For the Fe—Ni alloy:

$$\mu_2 \cdot f_r^2 = 1300 \text{ GHz}^2$$

For a composite whose packing factor is $\eta$, there is simply:

$$\mu_2 \cdot f_r^2 = \eta \cdot 1300 \text{ GHz}^2$$

The existence of such a relationship shows that $\mu_2$ and $f_r$ cannot be modified independently.

In particular, operation at higher and higher frequencies requires a reduction in magnetic permeability.

For a given working frequency f, an attempt is thus made, in general, to condition the material in such a way that the resonant frequency $f_r$ lies well above f. This assumes that the material can be adapted to the application under consideration. The resonant frequency could be modified by a heat treatment after deposit. But this technique has drawbacks: compatibility with the device's manufacturing processes is not assured and, in any case, the variations obtained remain small.

The purpose of the invention is to overcome these drawbacks.

SUMMARY OF THE INVENTION

It involves increasing the operating frequency of a magnetic circuit. Increasing the operating frequency of a magnetic circuit means raising to a higher frequency level at least the most restrictive phenomenon, this phenomenon being, in particular, gyromagnetic resonance, skin effect, dimensional resonance, etc . . .

To this end, the invention recommends introducing gaps into the circuit, these gaps being perpendicular to the direction of the field, i.e. perpendicular to the circuit's median line. These gaps will create a highly effective demagnetizing field in the material. The magnetic permeability will be lowered without the overall shape of the circuit or the magnetic material being modified. For example, in the case of magnetic recording heads (in which there is already at least one air gap), gaps can be added to the rest of the circuit in order to increase the frequency tolerance of the magnetic material. The more gaps there are perpendicular to the median flux (therefore to the median line of the magnetic circuit in the direction of the field), the more the demagnetizing field is increased and the more the permeability of the circuit is reduced, improving to the same extent its frequency tolerance. The magnetic circuit's cut-off frequency could thus be adapted to a set of specifications and the best possible permeability could be obtained for this frequency range with a given material.

It can be emphasized that, in a magnetic component, an attempt is sometimes made to maximize the permeability of the magnetic circuit in order to minimize losses.

Consequently, due to the relationship pointed out above, showing that the product of the permeability and the square of the resonant frequency remains constant for a given material, the higher the effective magnetic permeability of the material, the lower the gyromagnetic resonant frequency; this limits the component's operating frequency range. This limitation could be a hindrance for high-frequency applications such as the manufacture of integrated HF inductors (useful in particular for mobile telephones), HF transformers, HF magnetic recording heads, . . .

This invention runs counter to these tendencies by advocating on the contrary a reduction in permeability.

To be precise, the purpose of this invention is to provide a process for increasing the operating frequency of a magnetic circuit, this process being characterized by the fact that it consists of forming, in at least one part of this circuit, gaps perpendicular to the median line of the magnetic circuit.

In one advantageous method of implementation, the gaps are formed in parallel planes.

In another method of implementation, evenly-spaced gaps are formed with a certain pitch and a certain width.

The purpose of this invention is also to provide a magnetic circuit characterized by the fact that it contains, in at least one part of it, gaps perpendicular to the median line of the magnetic circuit and placed in parallel planes.

In an advantageous variant, these gaps are evenly spaced.

The invention offers many advantages:

a) It provides the means of adjusting the operating frequency range of a core or magnetic circuit, thus that of a component, while at the same time maintaining the best possible permeability. In practice, while using the same magnetic material, it is possible to choose a gap size and a spacing for these gaps so that, in particular, the gyromagnetic resonant frequency and the other characteristic frequencies are matched to the component's specifications. Instead of changing either the magnetic material or the shape of the magnetic circuit for each frequency range desired, it is consequently possible to have a wide range of possible frequencies for each pair (material, circuit shape).

b) It is fully compatible with the circuit manufacturing processes.

c) It does not change the macroscopic shape of the component or its magnetic circuit.

d) It provides the means of using the same magnetic material to make components having different operating frequencies.

DETAILED DESCRIPTION OF AN EMBODIMENT OF THE INVENTION

Producing a magnetic layer broken at regular intervals by gaps of width (e) made in the direction of the median line of the magnetic circuit with spacing (p), with a material having an intrinsic permeability $\mu$, whose static value is $\mu_s$, amounts to creating artificially a layer of material with an effective permeability of $\mu_e$, whose static value is $\mu_{es}$, such that:

$$1/\mu_{es} = (1/\mu_s) + (e/p)$$

When (e/p) increases, $1/\mu_{es}$ increases correspondingly, which shows that $\mu_{es}$ decreases. The decrease in $\mu_{es}$ is accompanied by a correlative increase in the resonant frequency in accordance with the relationship:

$$\mu_{es} \cdot f_r^2 = C,$$

in which C is a constant.

For a desired frequency $f_r$, knowing the constants C and $\mu_s$ of a material, it is possible to calculate the permeability $\mu_{es}$ to be obtained and find a width-pitch pair (e,p) satisfying the equation $1/\mu_{es} = (1/\mu_s) + (e/p)$. The circuit obtained, with its gaps having the corresponding dimensions and spacing, then has a frequency tolerance reaching $f_r$.

The preceding equations are in fact fairly approximate, the notion of permeability becoming itself less precise as the realm of magnetic fields is approached. To obtain greater precision, it is also possible, for each magnetic material being considered, to fabricate experimental devices with gaps with variable dimensions and spacings, and measure precisely the magnetic circuit's frequency tolerance, adopting in the end the optimum configuration.

Figure 1:
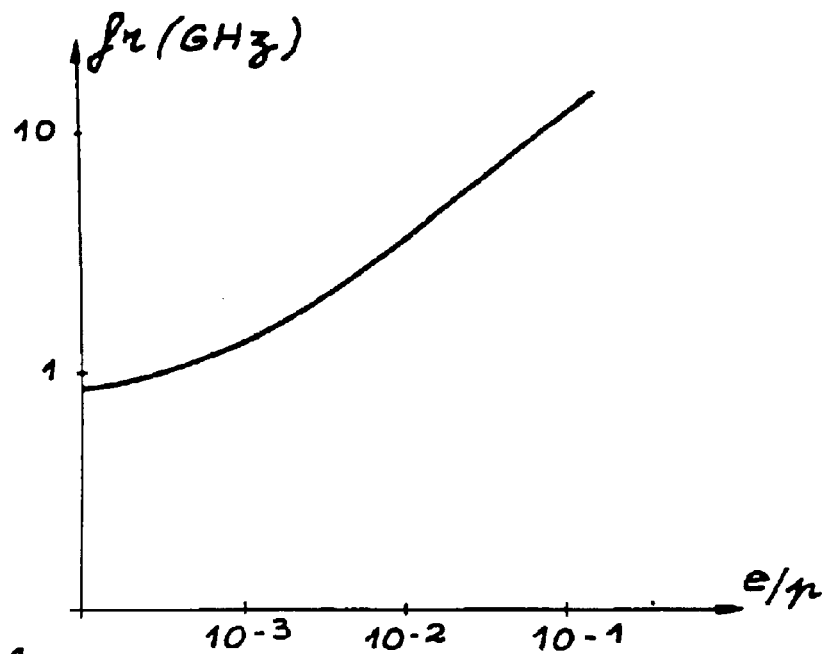
FIG. 1 shows the variations in the gyromagnetic resonant frequency $f_r$ in relation to the ratio (e/p) of the width (e) to the pitch (p) of the gaps.

The invention applies to single-layer magnetic circuits as well as to multi-layer circuits. FIG. 1 gives, for example, the variation in the cut-off frequency $f_c$ in relation to the ratio e/p for an iron-nickel and silicon nitride composite. The relationship linking the permeability $\mu_s$ and the frequency $f_r$ is, in this case: $\mu_s \cdot f_r^2 = 1300$ (GHz)$^2$.

When there are no gaps, the frequency $f_r$ is slightly below a Gigahertz and increases to approximately 10 GHz for gaps whose width is on the order of one tenth of the pitch (e/p=10$^{-1}$).

More roughly, it is also possible to estimate the influence of the evenly-spaced gaps on the other two characteristic frequencies related to the skin effect and dimensional resonance. Consequently, in a magnetic circuit of any shape, but having evenly-spaced gaps, therefore spread out regularly over the length of the circuit, it can be considered that the effective permeability defined by the equation $1/\mu_{es} = 1/\mu_s + e/p$ takes on a local aspect. It can then be shown that the two frequency limits being considered, that due to the skin effect and that due to dimensional resonance, are multiplied, respectively, by $\sqrt{\mu_s/\mu_{es}}$ and by $\mu_s/\mu_{es}$.

In all of these considerations, it is assumed of course that, for a multi-layer (or laminated) material, grooves were made throughout the layers.

FIGS. 2a to 2e illustrate five steps of a process for making a magnetic layer buried in a substrate. In this example, the magnetic layer is a branch of a magnetic circuit belonging to a vertical built-in-coil-type magnetic head such as that described in FR-A-2 745 111. In addition, this magnetic layer is multi-layer and the thicknesses of the various layers are not to the same scale in these figures.

Figure 2A:
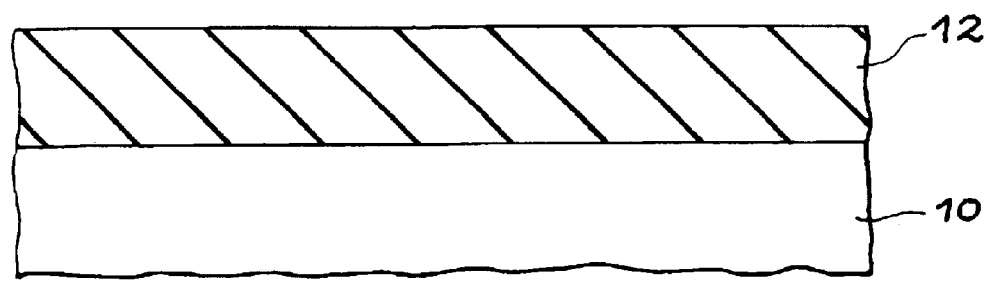
FIGS. 2a to 2e show the steps in the manufacture of part of a magnetic circuit for an initial variant of the invention.
Figure 2B:
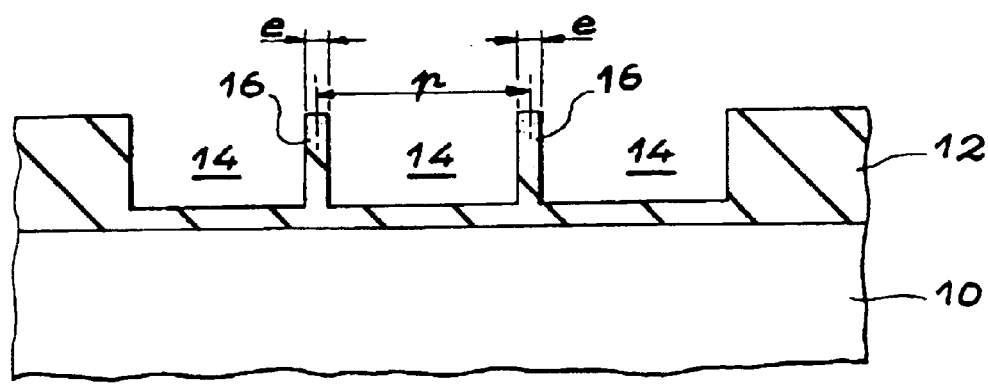
Figure 2C:
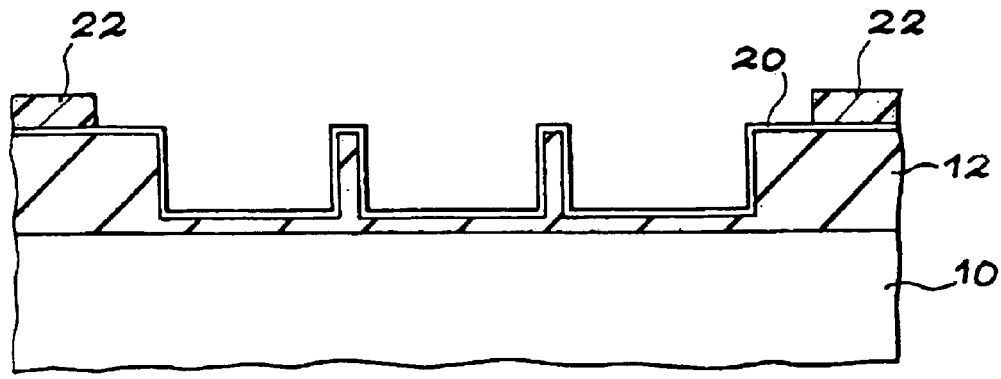
Figure 2D:
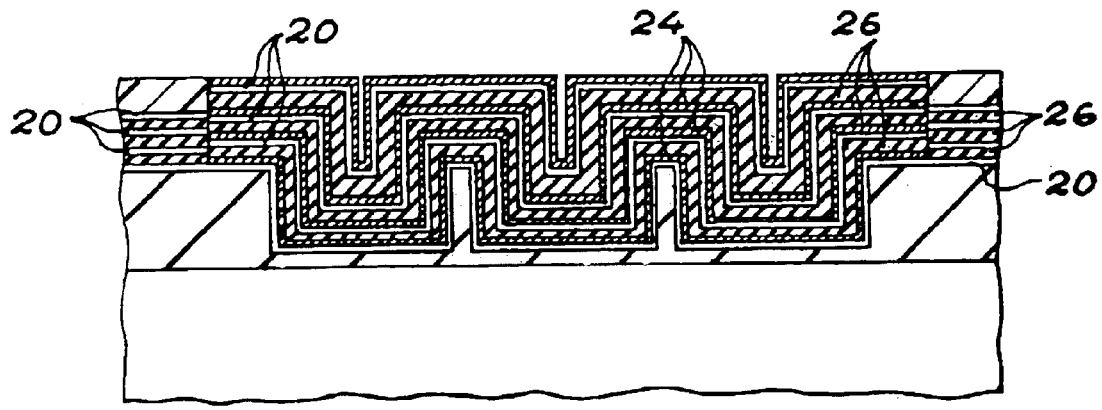

In this process, the operations start with a substrate 10 (FIG. 2a) which is, for example, made of silicon. On this substrate is deposited a thick layer 12 consisting of several microns of insulating material, silica for example. This layer 12 is next engraved by means of a mask having evenly-spaced openings. Pits 14 separated by walls 16 are then obtained (FIG. 2b). The thickness of these walls determines the width e of the future gaps and their spacing determines the pitch p of the said future gaps.

Next, an undercoat 20 is deposited on the entire surface (FIG. 2c) by, for example, sputtering with Fe—Ni, and a resin mask 22 is formed leaving clear the area where it is desired to produce the magnetic layer broken by the gaps.

Next, the magnetic layer 24 is deposited (FIG. 2d) by, for example, electrolytic growth of Fe—Ni on undercoat 20. The resin is then dulled, all surfaces are annealed if necessary, and a layer of insulating material 26 is deposited, for example $Si_3N_4$.

The operations of depositing an undercoat 20, masking, depositing a magnetic material 24, dulling of the resin, and depositing an insulating layer 26 are repeated, in this example of fabrication, several times so as to obtain a magnetic circuit composed of a stack of magnetic layers separated by non-magnetic layers, the second magnetic layer not necessarily being covered by an insulating layer.

Figure 2E:
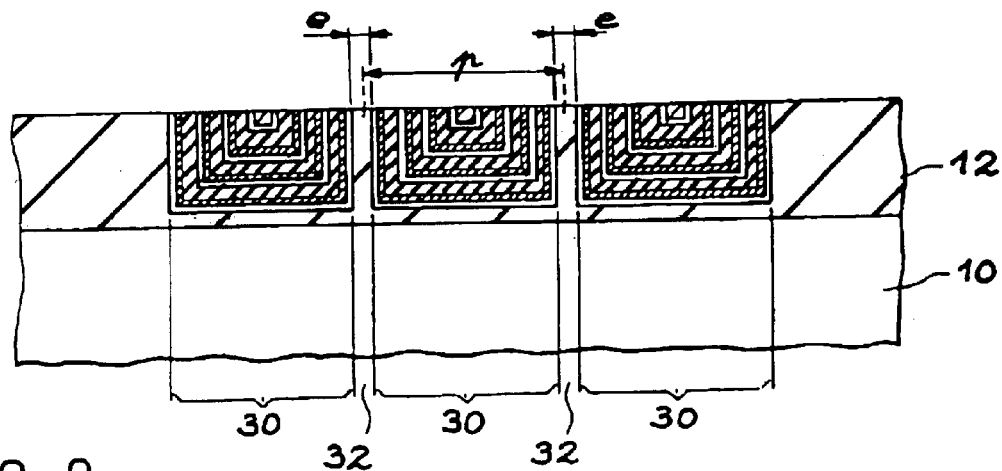

The stack thus formed is next planed down by mechanical or mechanochemical grinding (FIG. 2e). A set of magnetic slabs 30 separated from each other by gaps 32 is then obtained.

In the case of a single-layer magnetic circuit, the first magnetic layer 24 is grown, electrolytically for example, on undercoat 20 to a height filling the pits and planing down is then carried out as in FIG. 2e after dulling.

Figure 3A:
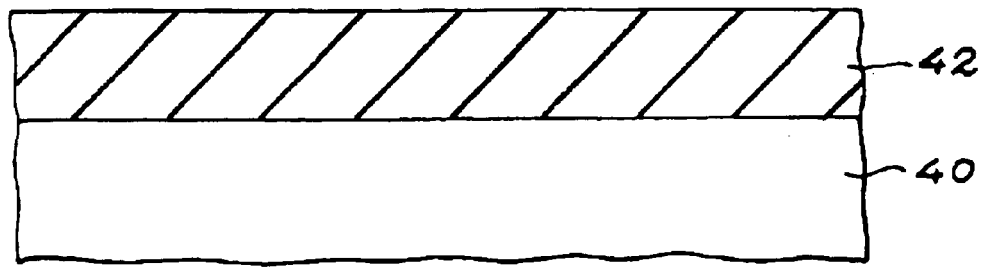
FIGS. 3a to 3c show the steps in the manufacture of part of a magnetic circuit for a second variant of the invention.
Figure 3B:
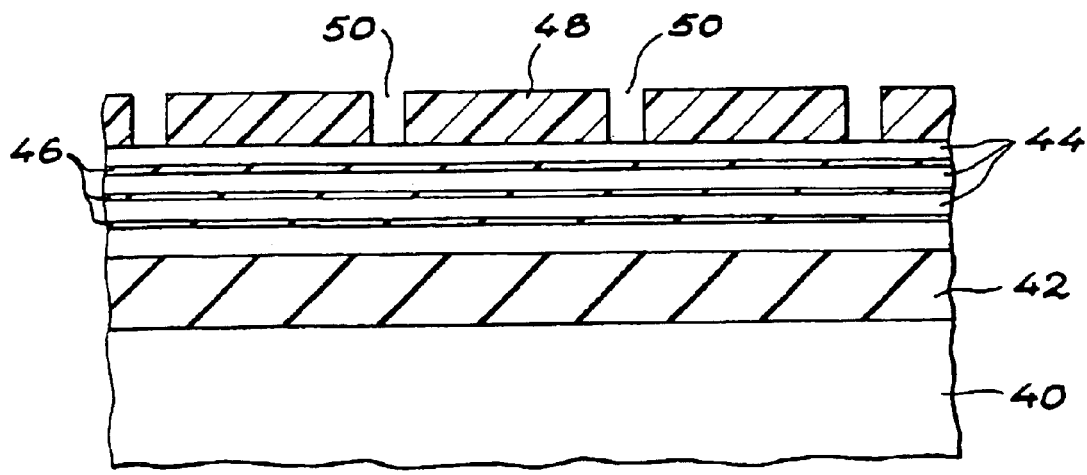
Figure 3C:
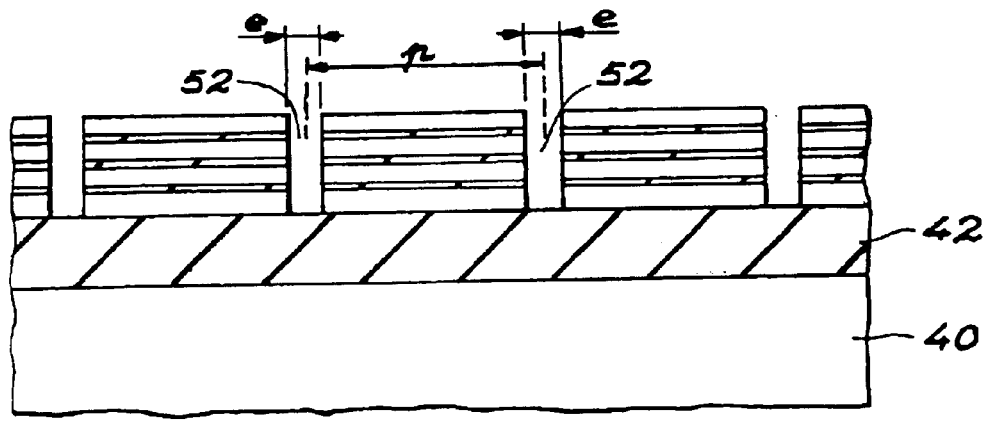

FIGS. 3a to 3c illustrate schematically another method for implementing the process involved in the invention. In FIG. 3a, the operations start with substrate 40 (made of silicon, for example) and this substrate is covered over with an insulating layer 42 (made of $SiO_2$, for example). Next, a stack of alternating layers is deposited (FIG. 3b), respectively magnetic 44 and insulating 46. The magnetic layers can be deposited by sputtering. The insulating layers can be made of $Si_3N_4$ and be deposited by sputtering. A resin mask 48 is next formed with openings 50.

Lastly, by means of an engraving operation (FIG. 3c), gaps 52 are formed in the multi-layer stack.

As in the previous case, this manufacturing variant can be used to produce a single-layer magnetic material.

Figure 4:
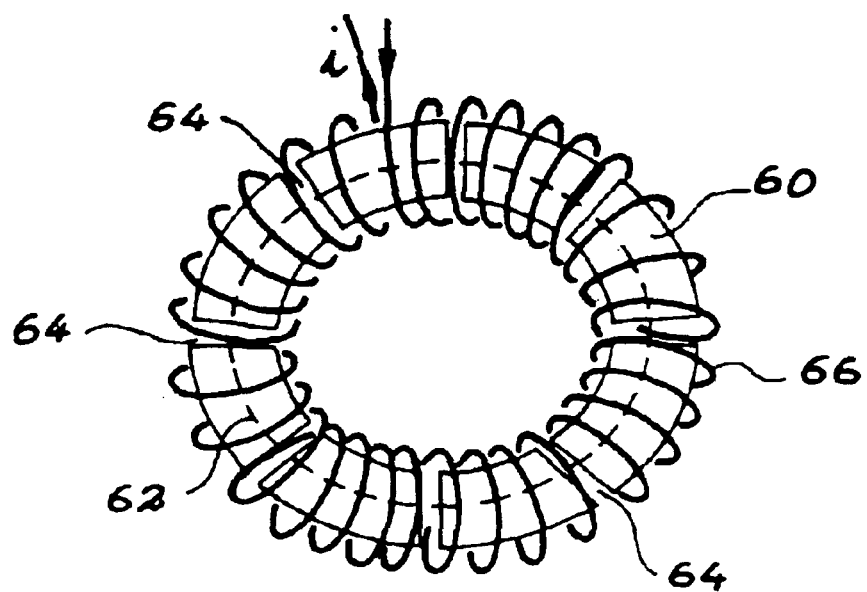
FIG. 4 shows an example of a magnetic circuit resulting from the invention, in the form of a toroid.

FIG. 4 shows an example of a magnetic circuit as defined by the invention. This involves a toroid 60 whose median line 62 is a circle. This circuit has gaps 64 perpendicular to this median line. They are therefore radial. The plane of these gaps rotates 360° when current flows through the circuit. A winding 66 is also shown.

Figure 5:
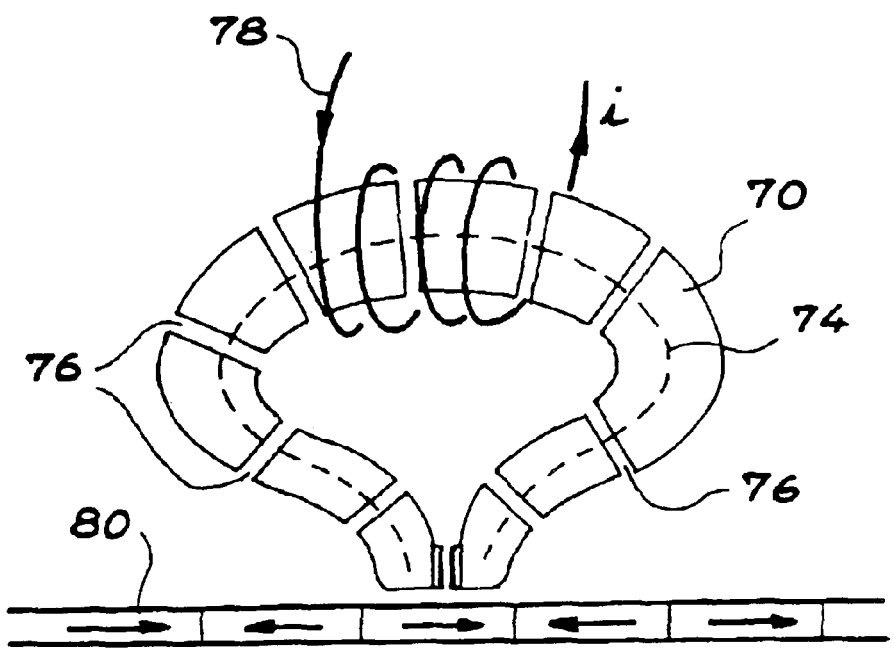
FIG. 5 shows another example of a magnetic circuit resulting from the invention adapted to a magnetic pickup head.

FIG. 5 shows another example of a magnetic circuit and corresponds to a magnetic pickup head. This circuit 70 shows a rounded rear portion and two side branches bent inwards so as to form an air gap 72. Median line 74 is roughly circular at the rear and turned inwards from both sides. Gaps 76 are perpendicular to this median line. The circuit is completed with a conductive winding 78 and is placed opposite a magnetic surface 80 carrying data in magnetic form.

It can be understood, through these examples, that the gaps do not necessarily lie in the same direction throughout the circuit. This direction may change from one point to another. It depends on the circuit's median line, therefore on the direction of the magnetic flux channeled by the circuit.

What is claimed is:

1. A magnetic head comprising:
   a bent magnetic circuit forming an air gap, said bent magnetic circuit coupled to a conductive winding; and
   a plurality of gaps disposed within the bent magnetic circuit at positions perpendicular to a median line of the bent magnetic circuit generating a demagnetizing field in the bent magnetic circuit at the positions of the plurality of gaps,
   wherein the plurality of gaps have a width and are spaced at a pitch to extend a frequency of operation of the magnetic head up to a resonant frequency,
   wherein the resonant frequency $f_r$ is given by relationship:

$$f_r = \sqrt{C\left(\frac{1}{\mu_s} + \frac{e}{p}\right)}$$

in which C is a constant, $\mu_s$ is static value of intrinsic permeability, e is the width of the plurality of gaps, and p is the pitch.

2. A magnetic circuit comprising:
   a magnetic layer having a median line and disposed with respect to an induced magnetic field so as to canalize, in the direction of the median line, said magnetic field,
   the magnetic layer being composed of a series of portions, two successive portions being separated from each other by a wall of insulating material disposed at a position perpendicular to the median line of the magnetic layer and generating a demagnetizing field in the magnetic layer at the position of said wall,
   wherein each wall of insulating material has a width and is spaced at a pitch to extend a frequency of operation of the magnetic circuit up to a resonant frequency,
   wherein the resonant frequency $f_r$ is given by relationship:

$$f_r = \sqrt{C\left(\frac{1}{\mu_s} + \frac{e}{p}\right)}$$

in which C is a constant, $\mu_s$ is static value of intrinsic permeability, e is the width of the plurality of gaps, and p is the pitch.

3. A magnetic circuit comprising:
   a magnetic layer having a median line and disposed with respect to an induced magnetic field so as to canalize, in the direction of the median line, said magnetic field,
   the magnetic layer being composed of a series of portions, two successive portions being separated from each other by a gap disposed at a position perpendicular to the median line of the magnetic layer and generating a demagnetizing field in the magnetic layer at the position of said gap,
   wherein each said gap has a width and is spaced at a pitch to extend a frequency of operation of the magnetic circuit up to a resonant frequency,
   wherein the resonant frequency $f_r$ is given by relationship:

$$f_r = \sqrt{C\left(\frac{1}{\mu_s} + \frac{e}{p}\right)}$$

in which C is a constant, $\mu_s$ is static value of intrinsic permeability, e is the width of the plurality of gaps, and p is the pitch.

4. A magnetic circuit comprising:
   a magnetic toroid having a median line and disposed with respect to an induced magnetic field so as to canalize, in the direction of the median line, said magnetic field,
   the magnetic toroid being composed of a series of portions, two successive portions being separated from each other by a radial gap disposed at a position perpendicular to the median line of the magnetic toroid and generating a demagnetizing field in the magnetic toroid at the position of said radial gap, wherein each radial gap has a width and is spaced at a pitch to extend a frequency of operation of the magnetic circuit up to a resonant frequency, wherein the resonant frequency $f_r$ is given by relationship:

$$f_r = \sqrt{C\left(\frac{1}{\mu_s} + \frac{e}{p}\right)}$$

in which C is a constant, $\mu_s$ is static value of intrinsic permeability, e is the width of the plurality of gaps, and p is the pitch.

5. A magnetic circuit comprising:

a magnetic layer having a median line and disposed with respect to an induced magnetic field so as to canalize, in the direction of the median line, said magnetic field, the magnetic layer being composed of a series of portions, two successive portions being separated from each other by a wall of insulating material disposed at a position perpendicular to the median line of the magnetic layer and generating a demagnetizing field in the magnetic layer at the position of said wall, wherein said magnetic layer is formed by a stack of alternatively magnetic and insulating layers.

6. A magnetic circuit comprising:

a magnetic layer having a median line and disposed with respect to an induced magnetic field so as to canalize, in the direction of the median line, said magnetic field, the magnetic layer being composed of a series of portions, two successive portions being separated from each other by a gap disposed at a position perpendicular to the median line of the magnetic layer and generating a demagnetizing field in the magnetic layer at the position of said gap, wherein said magnetic layer is formed by a stack of alternatively magnetic and insulating layers.

7. A magnetic circuit comprising:

a magnetic layer having a median line and disposed with respect to an induced magnetic field so as to canalize, in the direction of the median line, said magnetic field, the magnetic layer being composed of a series of portions, two successive portions being separated from each other by a wall of insulating material disposed at a position perpendicular to the median line of the magnetic layer and generating a demagnetizing field in the magnetic layer at the position of said wall, wherein each wall of insulating material has a width and is spaced at a pitch to extend a frequency of operation of the magnetic circuit up to a resonant frequency, and wherein said magnetic layer is formed by a stack of alternating magnetic and insulating layers.

8. A magnetic circuit comprising:

a magnetic layer having a median line and disposed with respect to an induced magnetic field so as to canalize, in the direction of the median line, said magnetic field, the magnetic layer being composed of a series of portions, two successive portions being separated from each other by a gap disposed at a position perpendicular to the median line of the magnetic layer and generating a demagnetizing field in the magnetic layer at the position of said gap, wherein each said gap has a width and is spaced at a pitch to extend a frequency of operation of the magnetic circuit up to a resonant frequency, and wherein said magnetic layer is formed by a stack of alternating magnetic and insulating layers.

* * * * *

UNITED STATES PATENT AND TRADEMARK OFFICE
CERTIFICATE OF CORRECTION

PATENT NO. : 6,940,383 B2
DATED : September 6, 2005
INVENTOR(S) : Albertini et al.

It is certified that error appears in the above-identified patent and that said Letters Patent is hereby corrected as shown below:

Title page,
Item [22], should read -- [22] PCT Filed: Sep. 28, 1998 --.

Signed and Sealed this

Eighth Day of November, 2005

JON W. DUDAS
*Director of the United States Patent and Trademark Office*